Patented July 3, 1951

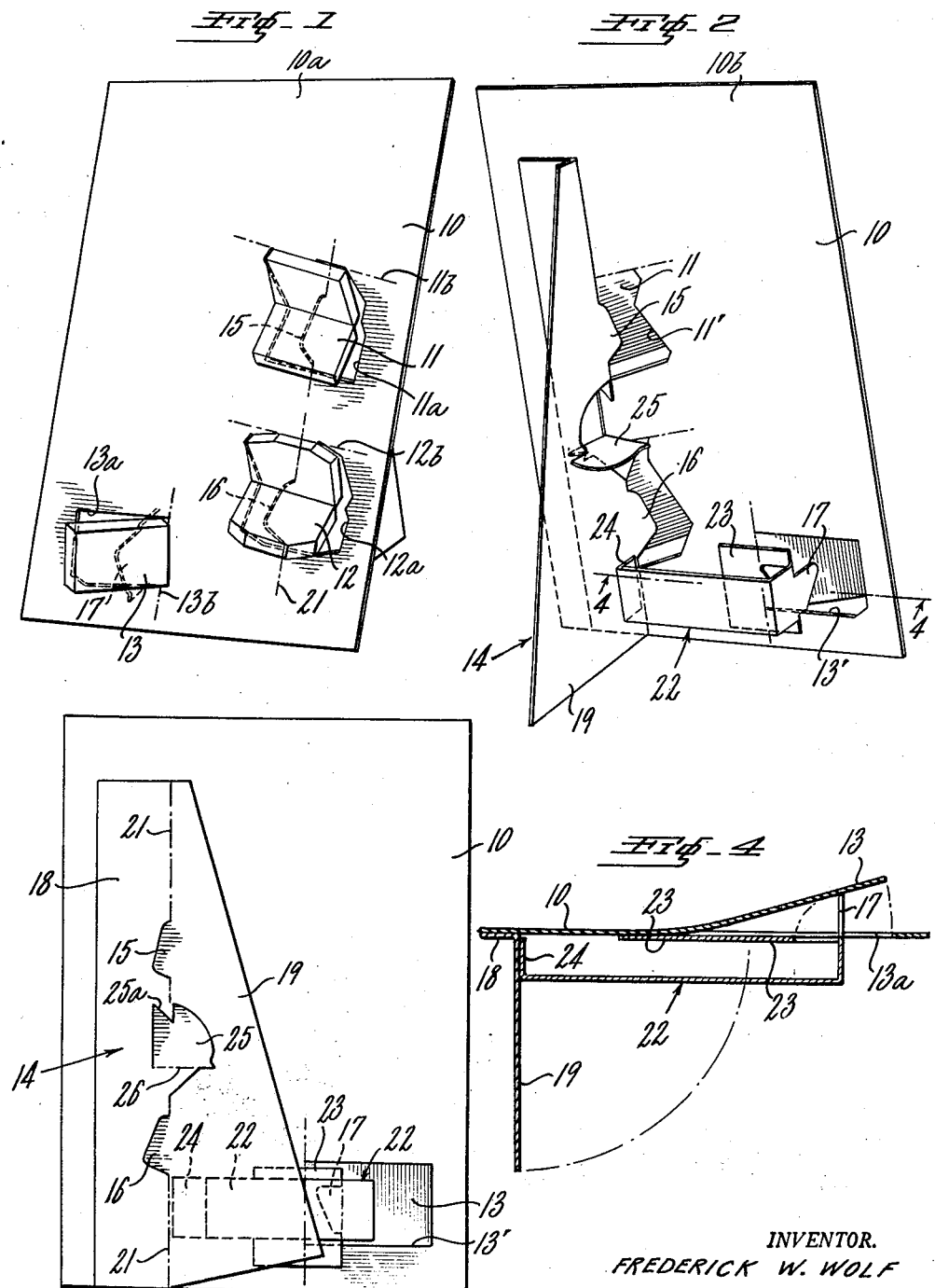

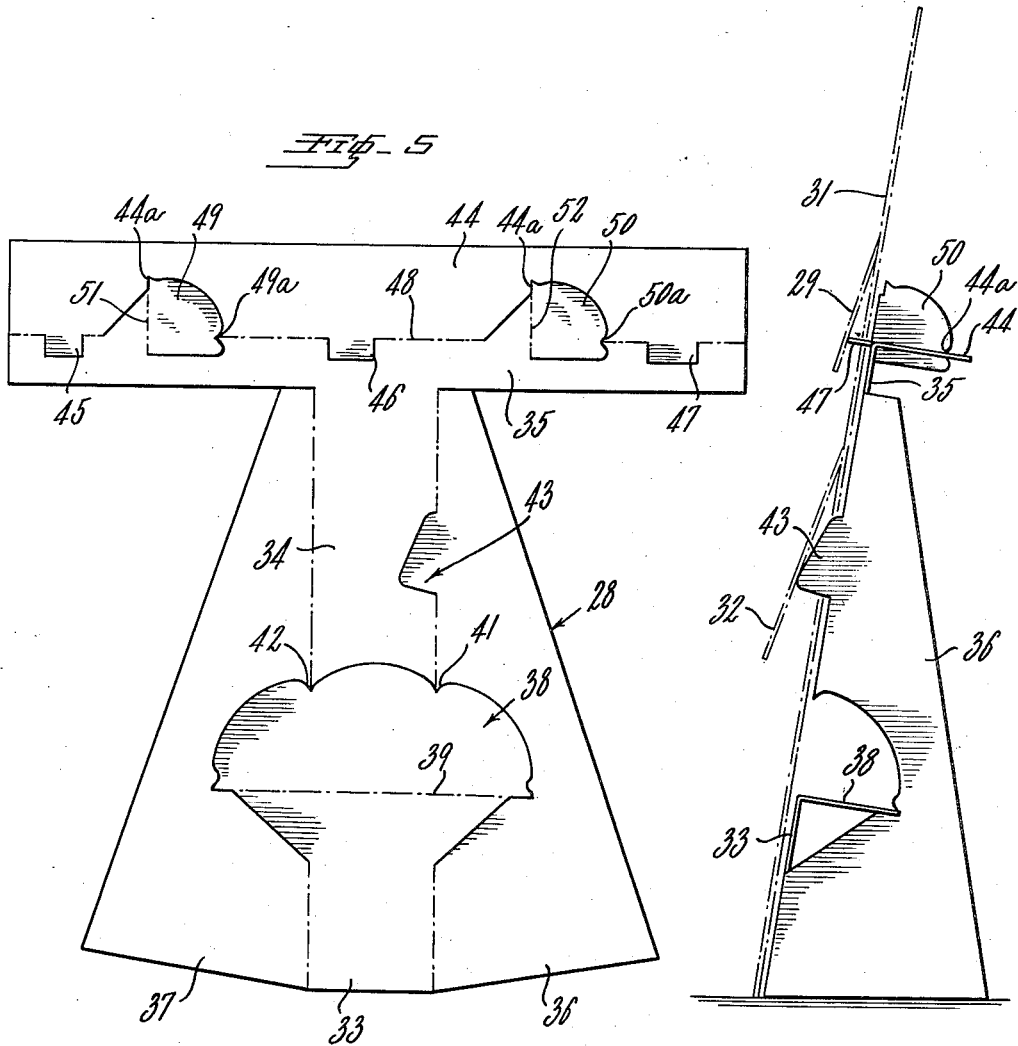

2,559,488

UNITED STATES PATENT OFFICE 2,559,488

SELF-SUPPORTING ADVERTISING OR DISPLAY DEVICE

Frederick W. Wolf, Brooklyn, N. Y.

Application March 18, 1949, Serial No. 82,041

8 Claims. (Cl. 211—72)

This invention relates generally to posters, advertising, display and similar devices which are maintained in upright position by means of an easel or similar support.

It is one of the objects of the present invention to provide means affording automatic movement of the display portions of a poster or like display device out of the plane of the latter while the display device is set up for use.

It is another object of the invention to provide means facilitating simultaneously support of the display device, as well as pivotal movement of one or more display portions and their outward thrust beyond the front surface of the display device to accentuate the subject matter which these portions represent and to make for a better display thereof.

It is still another object of the present invention to provide means offering the possibility of displacement of predetermined portions of a display device about predetermined axes (horizontal and/or vertical) thereof and relatively to each other and to the front surface of said display device upon setting up of the easel or easels by which said display device is supported in its upright condition.

Yet another object of the invention is the provision of means permitting simple construction, inexpensive manufacture and ready adaptability of advertising or display devices, which necessitate only a few parts for operation, can be easily produced through die stamping methods and require only a minimum of space since such display devices may be shipped in substantially flat condition.

Still a further object of the present invention is to provide means ensuring pleasing appearance, sturdy structure and fixation of movable portions when the easel of the display device is locked in position.

Still a further object of the present invention is to provide means securing great efficiency in the production of display devices which may be made very compact and conveniently operable through an easel or easels employed for maintaining the display device in substantially upright position, connections being coupled with said easel or easels to influence the position of predetermined portion or portions of the display device remote from said easel or easels to project beyond and angularly to the front surface of the display device for better display of such portions.

With the above and other objects in view, the invention will be hereinafter more fully described and the combination and arrangement of parts will be shown in the accompanying drawings and pointed out in the claims which form part of the specification.

In the drawings:

Fig. 1 is a front perspective view of an advertising or display device embodying features of the invention, portions of the device being thrust and retained in position beyond the front of the device.

Fig. 2 is a rear perspective view of the device with portions thereof in set up or operative position.

Fig. 3 is a rear elevational view of the device with its supporting member in collapsed or inoperative position and lying flush upon the rear face of the display device.

Fig. 4 is a fragmentary sectional view taken along line 4—4 of Fig. 2.

Fig. 5 is a front plan view of the supporting member according to the invention shown in modified form.

Fig. 6 is a side-elevational view of the supporting member of Fig. 5 placed in set up position and illustrating in dot and dash lines the manner in which portions of the display device are retained in a plane forwardly of the front surface of the device.

Referring now particularly to Figs. 1 to 4, 10 represents the display card or device having display portions 11, 12 and 13 struck out of the cardboard or similar material of which the device is made. These portions serve (among other purposes which are not shown) for the display of objects or articles in perspective and, when thrust forwardly of the surface of the device, will accentuate and prominently display them. When the device is not set up or collapsed, these portions are retracted and will lie within their cutouts or openings indicated, respectively, at 11a, 12a and 13a, passing from the front face 10a to rear face 10b. These portions are respectively pivoted about axes, indicated generally at 11b, 12b and 13b.

To cause the outward thrust of these portions automatically as the device is set up, there is secured to the rear face of the card 10 a foldable easel or support indicated generally at 14, and having projecting portions 15, 16 and 17 engaging respectively with the rear faces of the struck portions 11, 12 and 13 to retain them in their outward positions. The support 14 has a main portion 18 which is glued or otherwise secured to the rear face of the card 10. An adjustable supporting portion 19 has the projecting portions 15 and 16 and is swingable from the rear face of the card 10 about a vertical axis 21 connecting it with the main portion 18. A foldable extension 22 is connected to the swingable portion 19 to be operated thereby and has the projecting portion 17 for moving outwardly the struck portion 13 of the card 10. The foldable extension 22 has an attaching portion 23 which secures the extension to the rear face of the card adjacent to the struck display portion 13 and out of which the projecting portion 17 is projected. The extension 22 also has an attaching portion 24 for securing the extension to the supporting portion 19.

To hold the swingable supporting portion in its set up position, there is a notched retaining flap 25 struck out of the portions 18 and 19 of the support 14 and adapted to be hinged downwardly on an axis 26. This flap 25 has a notch 25a which receives and retains the inner edge of the supporting portion 19. When this flap 25 is lifted, the projecting and supporting portions can be pivoted about their respective axes to lie flat and flush upon the board 10. The struck portions 11, 12 and 13 will be permitted to move into their respective openings.

Referring now particularly to Figs. 5 and 6, there is shown a slightly different form of the invention wherein the easel or support, indicated generally at 28, is adapted for the projection of struck portions differently located upon the cardboard. This support will project struck portions 29 of a cardboard 31 and lying in a horizontal row laterally spaced from one another and also a struck portion 32 lying below the row of struck portions 29. This support has main vertically extending attaching portions 33 and 34 and a horizontal or transversely extending attaching portions 35 extending laterally from the opposite sides of the main attaching portion 34 and rigid therewith.

Hinged to the edges of the main vertically extending attaching portions 33 and 34 are respectively swingable supporting portions 36 and 37. When these portions are swung rearwardly, they are held by a flap 38 which can be pivoted downwardly about an axis 39 on the upper end of the attaching portion 33. This flap has notches 41 and 42 for receiving respectively the inner edges of the swingable portions 36 and 37. The swingable portion 36 has a projecting portion 43 for moving outwardly the struck portion 32 of the cardboard 31.

Hinged to the horizontal or transversely extending attaching portion 35 is a downwardly swingable portion 44 having projecting portions 45, 46 and 47 serving to respectively lift the transversely spaced struck portions 29 of the cardboard 31 beyond the front face thereof. The swingable portion 44 is hinged about axis 48.

Struck from the portions 35 and 44 are laterally spaced flaps 49 and 50 which are, respectively, swingable about vertical folds or axes 51 and 52 so that respective notches 49a and 50a may engage inner edges 44a of portion 44 when swung downwardly and substantially at right angles to transverse extension 35.

It will be apparent that with both supports 35; 36—37 struck or cut portions of the display or advertising device are automatically projected out of the plane of the front surface of the board as the supporting members are swung into operative and locked positions to support the device in substantially upright condition. It is not necessary to separately move out the struck portions, as this is done automatically. The retaining flaps for the supporting members are easily and quickly adjusted in place to lock the supporting members in their positions. The advertising device, when folded, consumes little space and all portions thereof lie flush and flat with one another.

It will be seen from the above disclosure that the easel or similar supporting means may either directly engage and operate movably arranged portions of the advertising device or link or similar connections 22 may be attached to the easel in order to operate through and from the latter these portions if they do not lie within direct reach of the easel.

It can further be seen that the portions of the advertising device which are preferably shown in perspective and which are to be prominently displayed in accordance with this invention, may be arranged to somewhat hingedly and resiliently swing or to be displaced about vertical and/or horizontal and/or inclined axes by means of projecting or cam portions hereinabove referred to which, in turn, may have different lengths and configurations to obtain various degrees of inclinations of the offset portions on display and which may be simultaneously or successively operated (either directly or indirectly) from the easel or easels or similar supporting means used for maintaining the poster or advertising device in operative and substantially upright position.

Although the invention has been described with respect to a certain specific embodiment thereof, it is to be distinctly understood that various modifications and adaptations of the arrangements herein disclosed may be made as may readily occur to persons skilled in the art without constituting a departure from the spirit and scope of the invention as defined in the objects and in the appended claims.

What is claimed is:

1. A self-supporting advertising or display card device comprising a display card having a struck portion adapted to be moved out of its opening and forwardly of the front of the card, a support having an attaching portion fixed to the rear of the display card, and an adjustable swinging portion hinged to the attaching portion, said adjustable swinging portion having a projecting portion thereon adapted to engage with said struck portion to move the same automatically outwardly beyond the front of the card upon the support being adapted to maintain the display card in an upright position.

2. A self-supporting advertising or display card device comprising a display card having at least one struck portion adapted to be moved out of its opening and forwardly of the front of the card, a support having an attaching portion fixed to the rear of the display card, an adjustable swinging portion hinged to the attaching portion, said adjustable swinging portion having a projecting portion thereon adapted to engage with said one struck portion to move the same automatically outwardly of the front of the card upon the support being adapted to support the device in an upright position, and a flap struck from the attaching and adjustable supporting portions adapted to be swung to a laterally projected position to receive the inner edge of the supporting portion and to retain the same in its supporting position.

3. A self-supporting advertising or display card device comprising a display card having struck portions adapted to be moved out of their openings and forwardly of the front of the card, a support for said display card and having an attaching portion fixed to the rear of the display card, an adjustable swinging portion hinged to the attaching portion, said adjustable swinging portion having a projecting portion thereon adapted to engage with one of said struck portions of the display card to move said one struck portion automatically outwardly of the front of the card upon the support being arranged to support the display card in an upright position, said swinging portion including a foldable extension attached thereto and to the rear of the display card and adjacent another struck portion of the card.

4. A self-supporting advertising or display card device comprising a display card having a struck portion adapted to be moved out of its opening to a position forwardly of the front of the main part of the card, a vertical support for the card having a main attaching portion fixed to the rear face of the card and a rearwardly swingable supporting portion hinged to the attaching portion, a foldable extension attached to the swingable supporting portion at one end and to the rear face of the display card at a location adjacent the struck portion thereof and having a projecting portion adapted to be swung as the swingable supporting portion is adjusted from the rear face of the display card, to lift the struck portion of the display card from its opening and to project said struck portion forwardly of said display card.

5. A self-supporting advertising or display card device comprising a display card having struck portions laterally spaced from one another and adapted to be respectively lifted out of their openings from the front of the display card, a support attached to the rear of the display card and having an attaching portion securing the support to the card, a swingable portion hinged to the attaching portion, projecting portions adapted to lift the struck portions of the card beyond the front face thereof, and means connecting the projecting portions together to automatically and simultaneously effect their movement.

6. A self-supporting advertising or display card device comprising a display card having spaced struck portions adapted to be lifted out of their openings to positions forwardly of the front of the card, a support having an attaching portion fixed to the rear face of the display card, projecting portions engageable respectively with the struck portions to effect the lifting of the same out of the openings, and means swingable upon the attaching portion to move the projecting portions.

7. A self-supporting advertising or display card device comprising a display card having spaced struck portions adapted to be lifted out of their openings and forwardly of the front of the card, a support having an attaching portion fixed to the rear face of the display card, projecting portions engageable with the struck portions to effect the lifting of the same out of the openings, means swingable upon the attaching portion to move the projecting portions, and flap means struck both from the attaching portion and said swingable means and engageable with said swingable means for moving the projecting portions whereby to retain said projecting portions in their extended positions and the struck portions of the card lifted from the front of the card.

8. A self-supporting advertising or display card device comprising a display card having laterally spaced struck portions adapted to be lifted out of their openings to positions beyond the front of the card, a support having integral vertically extending and horizontally extending attaching portions, projecting portions struck from the horizontally extending portions and lying respectively behind the struck portions and adapted to lift the same from their openings, a downwardly swingable portion connected with the projecting portions and adapted when swung downwardly to cause the projecting portions to lift the struck portions of the card from their openings, means for retaining the downwardly swingable portion in downwardly swung position, and a supporting portion swingable about the side of the attaching portion to a supporting position to support the display card from a horizontal surface.

FREDERICK W. WOLF.

No references cited.